Patented Apr. 14, 1925.

1,533,526

UNITED STATES PATENT OFFICE.

FERNANDO SOMOZA VIVAS, OF OAKLAND, CALIFORNIA.

PROCESS OF WATER AND FIRE PROOFING TIMBER.

No Drawing. Application filed June 14, 1923. Serial No. 645,349.

*To all whom it may concern:*

Be it known that I, FERNANDO SOMOZA VIVAS, a citizen of the United States, residing at Oakland, in the county of Alameda and State of California, have invented certain new and useful Improvements in Processes of Water and Fire Proofing Timber, of which the following is a specification.

The invention relates to a process of water and fireproofing timber and has as an object the provision of such a process as will render the timber impermeable to water and therefore will preserve the same against decay and will at the same time make the timber non-inflammable.

A further object of the invention is the provision of a process of treating timber to make the same water and fireproof which will not destroy the natural resilience of the timber and will therefore provide a product suitable for use as railroad ties. A further object of the invention is the provision of a process of treating timber that is sufficiently inexpensive to be applied to the treatment of telegraph poles, railway ties, and heavy timbers generally to make the same waterproof and non-inflammable.

In the carrying out of the process of the invention the timber is first immersed in a hot bath of borax and calcium chloride suitable proportions are found to be:

|  | Parts. |
|---|---|
| Borax | 30 |
| Calcium chloride | 50 |
| Water | 410 |

A suitable length of time for the immersing is found to be substantially twenty four hours for each inch of depth of the desired penetration.

After the timber has been thus treated it is removed from the first named bath and given a bath for a short time in a solution of iron sulphate, 60 parts, water 440 parts.

A desirable method of applying the materials is found to be the provision of immersion tanks into which tracks are laid upon which track cars bearing the timber may be run into the tank when a gate at the end of the tank is closed and the first bath is allowed to flow into the tank to submerge the timber. The solution is kept at a high temperature throughout the time of immersion whereby to cause the same to more freely penetrate the pores of the timber. After the immersion for the desired time in the first solution the material is pumped out and the second bath which may be used cold is allowed to flow into the tank for a short time, one half hour being found sufficient, after which the second solution is removed and the timber is removed from the tank.

The timber treated as above described is found to be substantially petrified for the depth to which the treatment is allowed to penetrate since there has been deposited in the pores of the timber, gypsum or calcium sulfate and calcium borate. With the thus treated surface the interior of the wood retains its natural resiliency and is therefore not rendered unsuitable for use as railroad ties or any structural purposes.

Minor changes may be made in the steps of the process without departing from the spirit of the invention.

I claim:—

1. The process of treating timber which comprises immersing the timber in a bath of borax, calcium chloride, and water and subsequently immersing the timber in an aqueous solution of iron sulfate.

2. The process of treating timber which comprises immersing the timber in a hot aqueous solution of borax, and calcium chloride and subsequently immersing the same in an aqueous solution of iron sulfate.

3. A water and fireproof timber comprising, wood having calcium sulfate and calcium borate deposited in its pores.

FERNANDO SOMOZA VIVAS.